(12) United States Patent
Douglas

(10) Patent No.: US 6,902,072 B2
(45) Date of Patent: Jun. 7, 2005

(54) COOKING UTENSIL HOLDER FOR PREVENTING INTERMINGLING OF COOKING LIQUIDS AND RESIDUE

(76) Inventor: Jerine A. Douglas, P.O. Box 27601, Philadelphia, PA (US) 19118

( * ) Notice: Subject to any disclaimer, the term of this patent is extended or adjusted under 35 U.S.C. 154(b) by 0 days.

(21) Appl. No.: 10/368,129

(22) Filed: Feb. 18, 2003

(65) Prior Publication Data
US 2003/0178380 A1 Sep. 25, 2003

Related U.S. Application Data
(60) Provisional application No. 60/357,093, filed on Feb. 15, 2002.

(51) Int. Cl.$^7$ .................................................. A47F 7/00
(52) U.S. Cl. .................. 211/70.7; 211/41.4; 211/85.31; 211/181.1
(58) Field of Search .............................. 211/70.7, 181.1, 211/41.3, 41.4, 41.9, 85.31, 85.25, 85.26, 119, 133.5; 248/37.3; D6/458, 462, 566; D32/55–58; 206/553

(56) References Cited

U.S. PATENT DOCUMENTS

| | | | | |
|---|---|---|---|---|
| 759,025 | A | * 5/1904 | Schiele | 211/106 |
| 1,939,504 | A | * 12/1933 | Lee | 211/133.5 |
| 2,793,761 | A | * 5/1957 | Geralds | 211/59.1 |
| 2,818,980 | A | * 1/1958 | Losching | 211/133.5 |
| 2,831,598 | A | * 4/1958 | Slavsky et al. | 220/482 |
| 3,175,694 | A | * 3/1965 | Reibold et al. | 211/60.1 |
| 3,268,087 | A | * 8/1966 | Kramer | 211/119.004 |
| 3,677,400 | A | * 7/1972 | Spier | 206/553 |
| 4,140,256 | A | 2/1979 | King | |
| 4,234,094 | A | * 11/1980 | Jorgensen | 211/88.01 |
| 4,318,478 | A | 3/1982 | De Winter | |
| 4,345,688 | A | * 8/1982 | De Boer | 211/70.6 |
| 4,756,582 | A | 7/1988 | Heien | |
| 4,799,744 | A | 1/1989 | Toy | |
| 4,830,200 | A | * 5/1989 | Zambano et al. | 211/133.5 |
| 5,109,990 | A | * 5/1992 | Murphy et al. | 211/41.3 |
| D330,987 | S | 11/1992 | Rosenthal | |
| D331,675 | S | * 12/1992 | David | D6/462 |
| 5,423,437 | A | 6/1995 | Kayem | |
| 5,460,276 | A | 10/1995 | McKeon et al. | |
| 5,850,784 | A | * 12/1998 | Conner | 99/485 |
| 6,161,718 | A | 12/2000 | Monbo | |
| 6,308,841 | B1 | * 10/2001 | Donnelly | 211/70.6 |
| 6,491,170 | B1 | * 12/2002 | Madela | 211/41.3 |
| 2002/0185166 | A1 | * 12/2002 | Rosenbauer et al. | 134/200 |

FOREIGN PATENT DOCUMENTS

WO  WO 01/43617 A1 * 6/2001

* cited by examiner

Primary Examiner—Jennifer E. Novosad
(74) Attorney, Agent, or Firm—RatnerPrestia

(57) ABSTRACT

A cooking utensil holder for storing cooking utensils with a waste collection tray and a support structure allowing cooking utensils to be oriented in a substantially vertical position and positioned above the floor and within the walls of the removable waste collection tray. The support structure has at least a first and a second utensil opening with the first utensil opening narrower than the second utensil opening and sized to maintain a knife in a substantially vertical position with the handle end pointed away from the waste collection tray. The second utensil opening is wider than the first utensil opening. At least one waste run off opening is provided in the bottom of the support structure and sized to allow liquid and solid waste to collect in the waste collection tray without clogging the waste run off opening when cooking utensils are stored. There is at least one cross member of sufficient thickness to fit between the tines of a fork, and positioned within at least one of the first and second utensil openings to maintain the tines above any waste collected in the waste collection tray, when resting on the at least one cross member. There is also at least one cooking utensil support associated with each of the cooking utensil openings to maintain the working end of a non-fork cooking utensils above any waste collected in the waste collection tray.

8 Claims, 6 Drawing Sheets

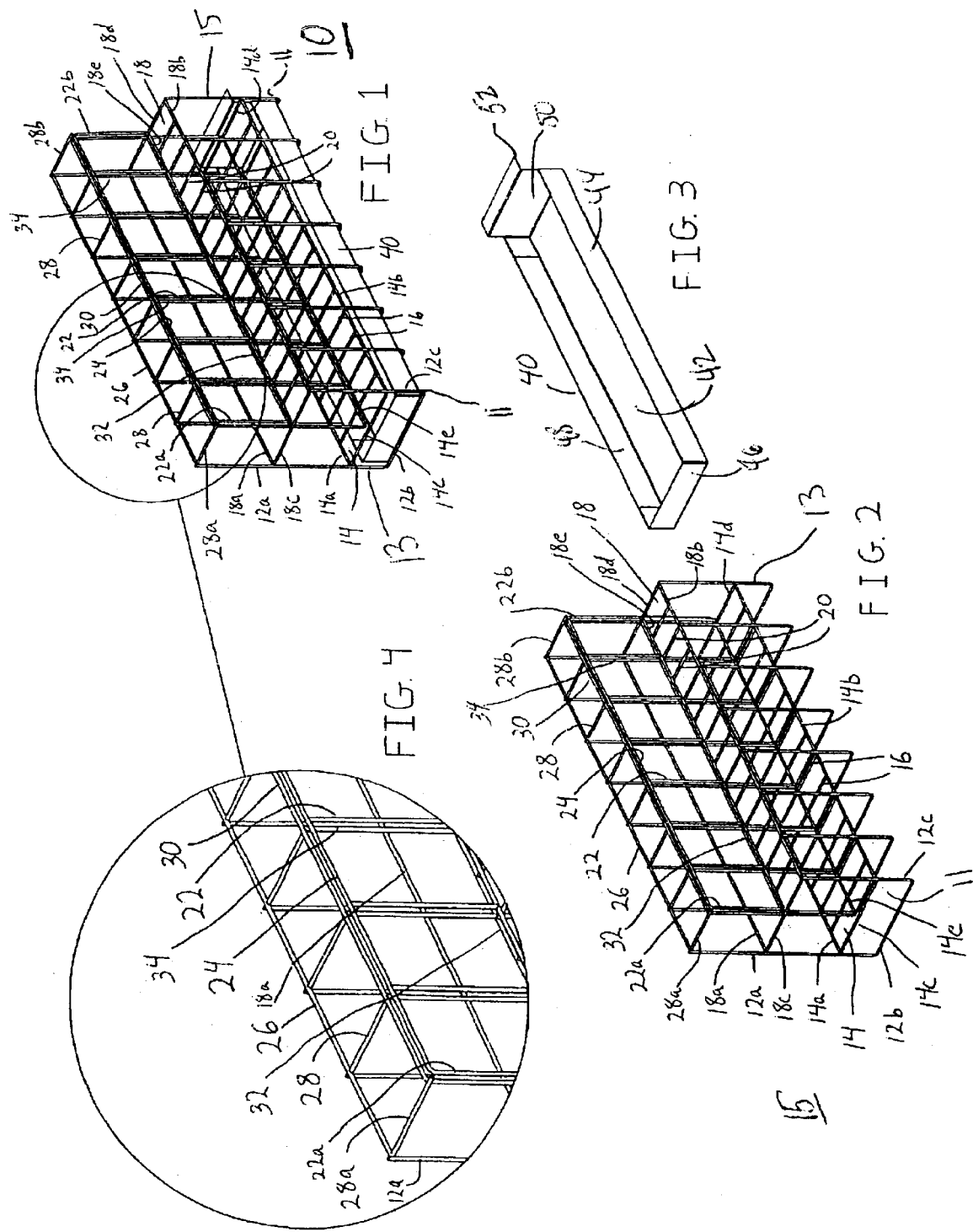

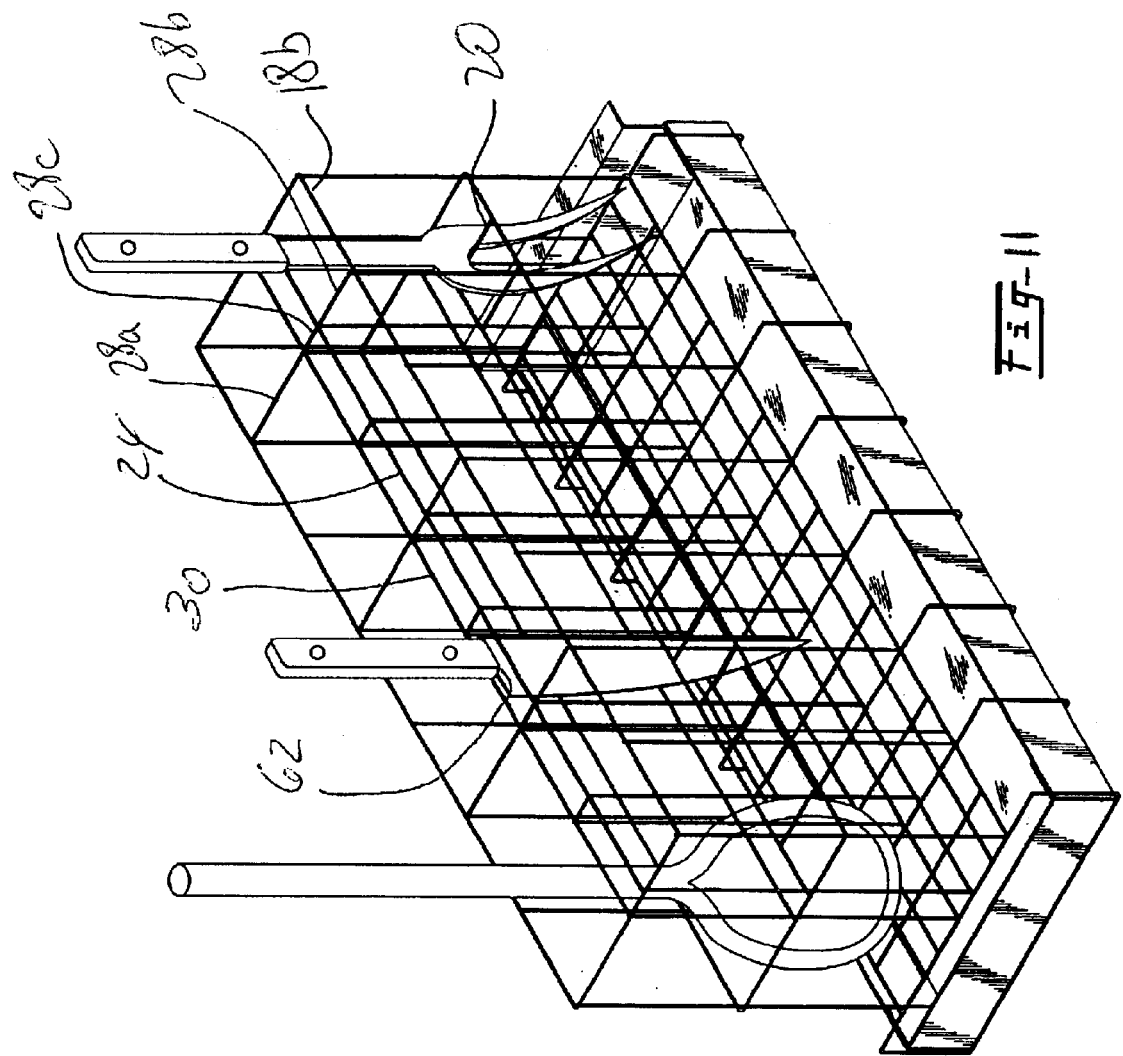

COOKING UTENSIL HOLDER FOR PREVENTING INTERMINGLING OF COOKING LIQUIDS AND RESIDUE

RELATED APPLICATION

This application claims the benefit of priority to U.S. Provisional Patent Application No. 60/357,093, filed on Feb. 15, 2002, the contents of which are incorporated in this application by reference.

FIELD OF THE INVENTION

The present invention relates to cooking utensil holders and more particularly, to a cooking utensil holder that organizes cooking utensils and prevents the intermingling of cooking and liquids residues that adhere to cooking utensils during cooking.

BACKGROUND OF THE INVENTION

A common problem while cooking is how to organize and store (while cooking) the multitude of cooking/kitchen utensils that are used to prepare, cook and serve the many courses and dishes involved in a meal. These cooking utensils include forks with two or more tines, non-fork utensils such as knives, spoons, spatulas, ladles, and others. Cooking utensils are often left on the counter, dripping liquid and solid residue/waste from the dishes for which they are being used. This raises both sanitary and organizational problems for the cook/user.

When more than one utensil is placed on the counter or on a plate, the liquid and solid residues can be co-mingled between the utensils. The co-mingling combined with the possibility of picking up the wrong utensil for a particular dish increases the chance that residue from one dish will contaminate another dish. The contamination can range from merely affecting the flavor to causing bacterial contamination if a utensil was used with raw meats, fishes or vegetables.

Still further, when more than one utensil is being used and all of the utensils are placed on a single plate or in a single bowl, it is necessary to pick up all of the utensils and transfer them to another a plate or bowl in order to clean the liquid and solid residue/waste that accumulates over time.

U.S. Pat. No. 4,799,744 discloses a cook's caddy and recognizes the problems of cross contamination and residue removal, but allows the utensils to potentially sit in the utensil residues if the funnel openings in the floor become clogged. In addition, this patent fails to address the problem of thin utensils, such as knives or some forks that will not sit up in the wide compartments shown and described. Still further, without special compartments for thin utensils, and despite recognizing the problem, the patent and design actually encourages co-mingling of utensils in the compartments, as shown in figures.

U.S. Pat. No. 4,318,478 discloses a utensil assembly that stores utensils upside down with the working end oriented towards the bottom of the assembly. While this utensil assembly allows easy identification of the utensils and provides a separate compartment for each utensil, the residue/waste can co-mingle between the working ends of utensils stored upright in the utensil assembly. In addition, by orienting the handle ends downward towards the lower end of the utensil assembly, residue/waste can run down the handle causing additional mess.

U.S. Pat. No. 6,161,718 discloses a utensil basket that is shown sitting in a tray, with the tray designed to protect a counter from the utensils in the utensil basket. In such a design, the utensils rest on the bottom of the basket which in turn sits directly on the tray. The bottom of the tray can sit completely submerged in residue/waste that dripped from the utensils, as well as directly contacting the bottom of the tray through the basket. In doing so, the utensils can contact any residue/waste collected in the tray from any or all of the utensils.

The present invention is a unique wire rack and framed holder which is easily manufactured and easily movable on any horizontal surface that holds multiple kitchen utensils of various sizes and types for cooking only.

A primary object of the present invention is to provide a device that will overcome the shortcomings of the prior art.

Another object is to provide a device that allows the user to clearly see all of the utensils being stored in the device so that the user may easily select the appropriate utensil desired and not use the wrong utensil.

An additional object is to provide a device that has a wide and open drainage grill that permits not only the drainage of liquids from the stored utensils but the drainage of larger food particles as well, without a concern for the drainage area becoming clogged and creating an environment for contamination.

A further object is to provide a device that holds the stored utensils separate and above their drained liquids and food particles so as not to have utensils sitting in their own food waste.

A still further object is to provide a device that is inexpensive to manufacture.

SUMMARY OF THE INVENTION

The present invention involves a cooking utensil holder for storing kitchen utensils having a working end and a handle end. A waste collection tray having four side walls and a floor is provided for collecting waste. A support structure allowing cooking utensils to be oriented in a substantially vertical position has an upper end and a lower end, with the lower end positioned above the floor and within the walls of the removable waste collection tray. The support structure has at least a first and a second utensil opening in the top end of the support structure with the first utensil opening narrower than the second utensil opening and sized to maintain a knife in a substantially vertical position with the handle end pointed towards the upper end and away from the waste collection tray. The second utensil opening is wider than the first utensil opening and sized to maintain the handle end of a non-knife cooking utensil pointed towards the upper end away from the waste collection tray. At least one waste run off opening is provided in the bottom of the support structure and sized to allow liquid and solid waste to run off of the cooking utensils and collect in the waste collection tray without clogging the waste run off opening when the cooking utensils are stored in the cooking utensil holder. There is at least one cross member of sufficient thickness to fit between the tines of a fork, with the cross member positioned within at least one of the first and second utensil openings to maintain the fork in a substantially vertical position with the handle end pointed upward away from the waste collection tray and the working end above any waste collected in the waste collection tray, when resting on the at least one cross member. There is also at least one cooking utensil support associated with each of the cooking utensil openings to maintain the working end of a non-fork cooking utensils above any waste collected in the waste collection tray.

In an additional embodiment, a waste collection tray holder is attached to the bottom of the support structure with a waste collection tray opening in the bottom of the support structure through which the waste collection tray can be inserted and removed and to position the waste run off opening above the floor and within the walls of the removable waste collection tray.

BRIEF DESCRIPTION OF THE DRAWINGS

The present invention will not be described by way of non-limiting example, with reference to the attached drawings in which:

FIG. 1 is a perspective view of a cooking utensil holder in accordance with the present invention;

FIG. 2 is a perspective view of the support structure shown in FIG. 1;

FIG. 3 is a perspective view of the waste collection shown in FIG. 1;

FIG. 4 is an expanded view of the compartments of the Cooking utensil holder shown in FIG. 1;

FIG. 11 is an expanded view of the populated compartments shown in FIG. 7.

DETAILED DESCRIPTION OF THE INVENTION

Figure 5:
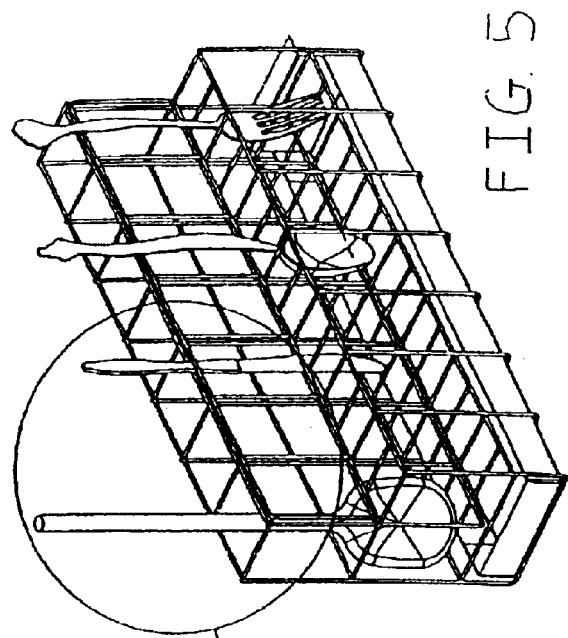
FIG. 5 is a perspective view of a cooking utensil holder populated with cooking utensils in accordance with the present invention.

An exemplary embodiment of a cooking/kitchen utensil holder 10 with removable waste collection tray 40 in accordance with the present invention is illustrated in FIGS. 1–6.

FIG. 1 shows kitchen utensil holder 10 with waste collection tray 40 fully inserted into one of a pair of waste collection tray openings 11 of a waste collection tray holder section 13. Waste collection tray holder section 13 is in the bottom of support structure 15. FIG. 2 shows support structure 15 of kitchen utensil holder 10 with waste collection tray 40 removed. In an exemplary embodiment, support structure 15 is a wire frame structure formed of multiple lop-sided U shaped members 12, fabricated from single lengths of wire. Each lop-sided U shape 12 is formed from wire bent to define an elongated, vertical back segment 12a, then bent 90 degrees at one bottom end to form a horizontal bottom segment 12b, and then bent 90 degrees at the other bottom end to form a vertical front segment 12c and complete a lop-sided U shape member 12. In the exemplary embodiment shown in FIGS. 1, 2 and 5, front segment 12c is does not extend as far in the vertical direction as back segment 12a.

Multiple lop-sided U shaped members 12 are connected to define a waste collection tray holder 13 in the bottom section of kitchen utensil tray holder 10. Waste collection tray holder 13 has a waste collection tray opening 11 with enough clearance to permit the insertion and removal of waste collection tray 40 along a longitudinal axis.

Waste collection tray 40 has a floor 42 and four side walls 44, 46, 48 and 50. Waste collection tray 40 is shown with an optional handle 52 to allow for easier insertion, removal and transport of waste collection tray 40.

A rectangular perforated drainage grill 14 is joined to lop-side u shaped members 12. Perforated drainage grill 14 is substantially rectangular and keeps the tips and cooking/working ends of the kitchen utensils from touching any part of waste collection tray 40. Perforated drainage grill 14 has longitudinal edges 14a and 14b, lateral edges 14c and 14d. Further stability is added to perforated drainage grill 14 by a center stabilizing member 14e that runs directly along the center length of perforated drainage grill 14 between opposite lateral edges 14c and 14d. The perforations of perforated drainage grill 14 serve as waste run off openings in the bottom of support structure 13 and are sized to allow liquid and solid waste to run off of kitchen utensils and collect in waste collection tray 40 without clogging the perforations when kitchen utensils are stored in kitchen utensil holder 10. Perforated drainage grill 14 serves as a cooking utensil support to maintain the working end of non-fork kitchen utensils above any waste in waste collection tray 40.

Extending perpendicular to longitudinal edges 14a and 14b and across center stabilizing member 14e are a plurality of spaced, parallel, lateral strands 16. Lateral strands 16 are divided into two groups. The first group of lateral strands 16 are joined to back segments 12a, and front segments 12c of each lop-sided U shaped member 12, as well as to center stabilizing member 14e. The second group of lateral strands 16 extends between each lop-sided U shaped member 12, are each evenly spaced between each lop-sided U shaped member 12 and are each joined to center stabilizing member 14e and longitudinal members 14a and 14b.

At the highest point of front member 12c a second rectangular perforated grill 18 is attached and which serves to hold shorter utensils in a generally vertical position. Perforated grill 18 has longitudinal edges 18a and 18b and lateral edges 18c and 18d. Stability is added to perforated grill 18 by center stabilizing member 18e that runs directly along the center of perforated grill 18 between lateral edges 18c and 18d.

Extending perpendicular to longitudinal edge 18b and center stabilizing member 18e are a plurality of spaced, parallel, lateral strands 20. Lateral strands 20 are also divided into two groups, similar to the distribution of lateral strands 16. The first group of lateral strand 20 are joined to center stabilizing member 18e and front member 12c of each lop-sided U shaped member 12. The second group of lateral strands 20 extends between each lop-sided U shaped member 12, are each evenly spaced between each lop-sided U shaped member 12, and are each joined to the center stabilizing member 18e and longitudinal edge 18b. This permits shorter utensils to be inserted into the front of kitchen utensil holder 10, while providing a larger opening in the back of kitchen utensil holder 10 for insertion of longer and wider cooking utensils.

Center support members 22 extend vertically upward from center stabilizing member 14e. Center support members 22 are also parallel to both back member 12a and front member 12c of each lop-sided U shaped member 12. Center support members 22 are equal in number to the number of lop-sided U shaped members 12 and run through and connect with center stabilizing member 18e. Center members 22 have a height equal to that of back member 12a. Additional stability is provided to center support members 22 by top front member 24 that runs directly from center support member 22a at one end of support structure 15 to is center support member 22b at the other end of support structure 15. Further stability is added by top back member 26 that runs across and is attached to the tops of back members 12a. Extending perpendicular to each center vertical member 22 at the top of support structure 15 are a plurality of spaced, parallel, lateral strands 28. Lateral strands 28 extend between each center support member 22 and are joined to respective back members 12a. This permits longer and wider utensils to be inserted into the back of kitchen utensil holder 10 and keeps the longer and wider utensils in a largely vertical position to allow maximum dripping of liquids or foods remaining on a kitchen utensil, through perforated drainage grill 14 and into waste collection tray 40.

Provision is made for the stable storage of knives in a generally vertical position as well. Extending perpendicular from lateral strand 28a to lateral strand 28b, slightly closer to top back member 26, an off-center longitudinal member 30 is added. An additional longitudinal member 32 is added to perforated grill 18, directly below off-center longitudinal member 30, running perpendicular to lateral strands 18c and 18d. Extending upward from additional longitudinal member 32, parallel to back member 12a of each lop-sided U shaped member 12 and equal in number to the number of lop-sided U shaped member 12, and running up to and connecting with the off-center longitudinal member 30, are off-center vertical members 34. These off-center vertical members 34, along with the two longitudinal members, 30 and 32, create a narrow slot that permits knives to be inserted, on a generally vertical position, for temporary storage, as shown in FIG. 5 and in an expanded view in FIG. 6. The two longitudinal members, 30 and 32 are spaced to prevent the insertion a knife handle, causing the knife handle to rest on the two longitudinal members 30 and 32. The two longitudinal members 30 and 32 thus serve as an additional cooking utensil support to maintain the working end of narrow kitchen utensils, such as a knife with a handle wider than its blade, above any waste in waste collection tray 40.

As seen in FIGS. 1 and 3, waste collection tray 40 is dimensioned to rest on bottom horizontal member 12b of each lop-sided U 12. With a waste collection tray opening 11 on each side of waste collection ray holder section 13, waste collection tray 40 may be inserted in either end of kitchen utensil holder 10 depending on the need of the user.

Figure 6:
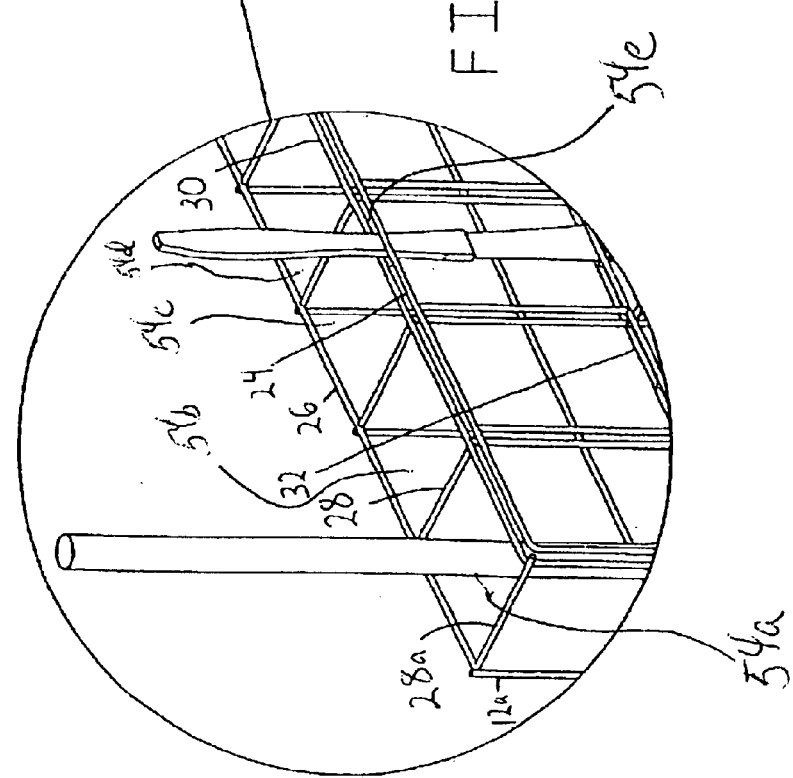
FIG. 6 is an expanded view of the populated compartments shown in FIG. 5.
Figure 7:
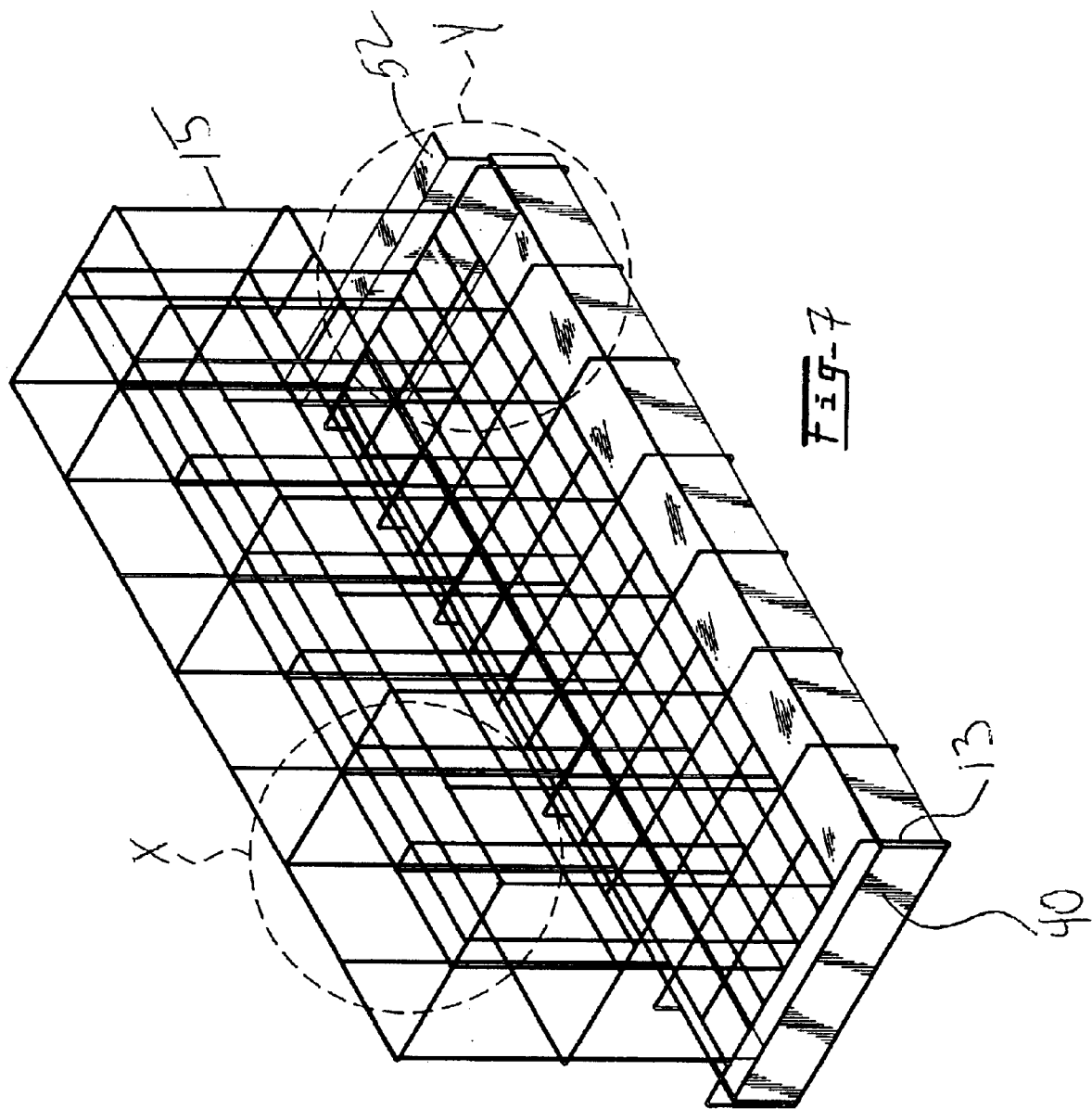
FIG. 7 is a perspective view of an additional embodiment of a cooking utensil holder in accordance with the present invention.
Figure 8:
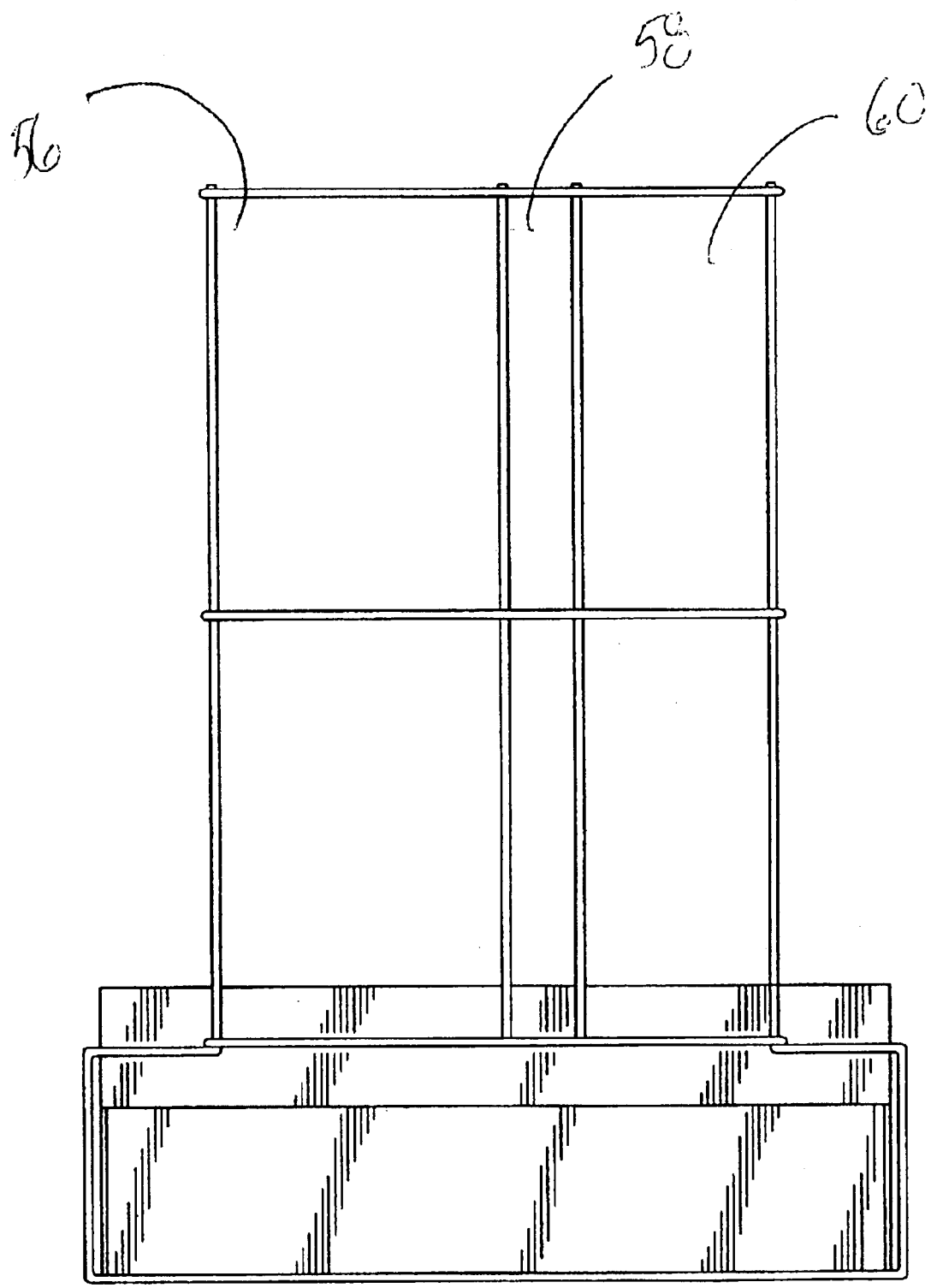
FIG. 8 is a side view of the cooking utensil holder shown in FIG. 7.
Figure 9:
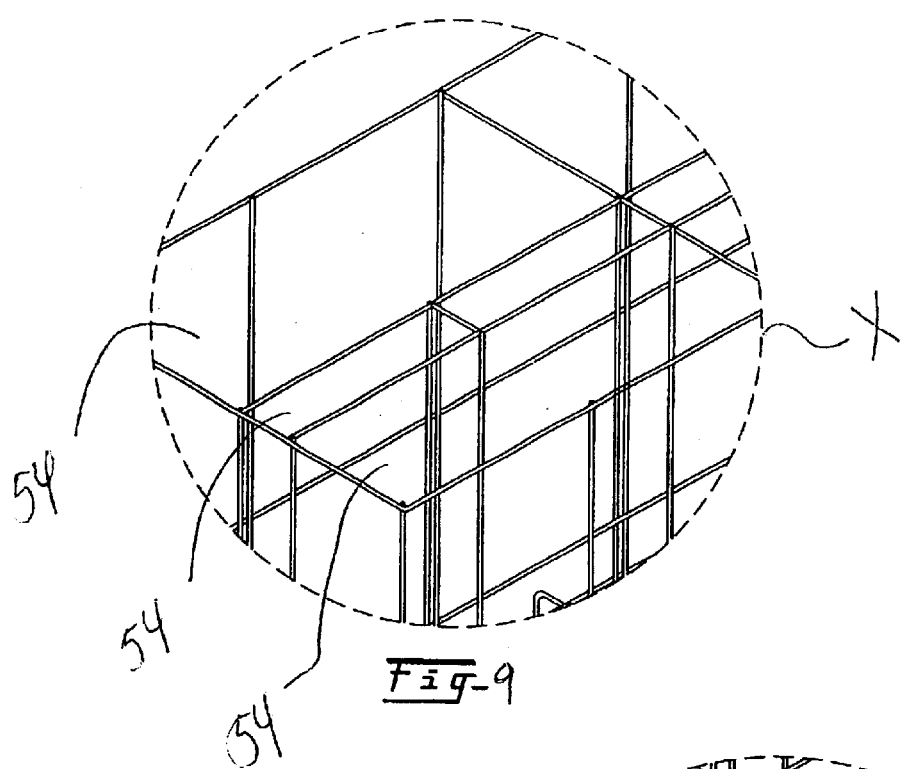
FIG. 9 is an expanded view of the compartments of the cooking utensil holder shown in FIG. 7.
Figure 10:
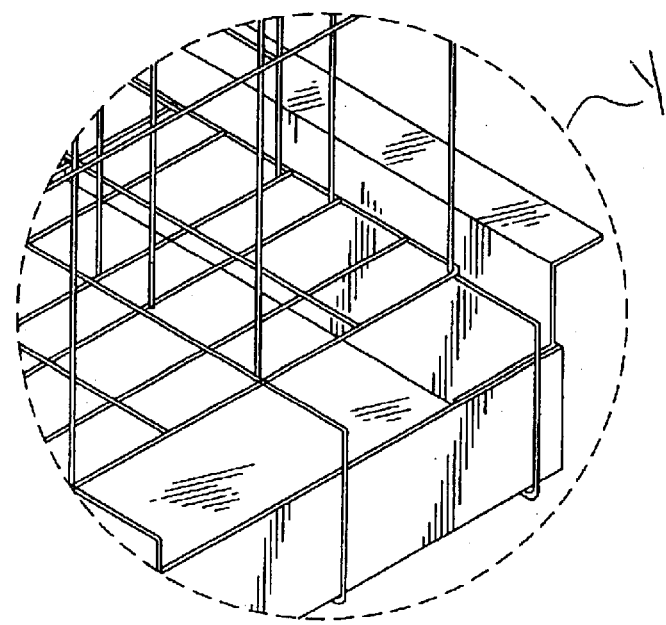
FIG. 10 is an expanded view of the waste collection tray inserted in the opening of waste collection tray holder of the cooking utensil holder shown in FIG. 7.

FIG. 6 shows kitchen utensils, each positioned in an individual utensil opening 54. A number of individual utensil openings/compartments 54a–54e are identified in FIG. 6 for reference purposes. The present invention as shown in the Figures, include more than these example identified openings for cooking utensils. In the exemplary embodiment, there are three rows of utensil openings shown, with each utensil opening defined by the respective longitudinal members 18a, 18b, 18e, 24 and 26 for that row and the respective lateral strands 20 and/or 28. Varying numbers of lateral strands 20 and/or 28 can be used to define fewer or greater number of utensil openings. In an alternative embodiment, the number and position of lateral strands 10 and/or 28 are variable, allowing the user to configure the appropriate size and number of utensil openings 54 for a particular users application.

Support structure 13 is described in the exemplary embodiments as a wire frame or wire mesh frame in an exemplary embodiment. The wires/wire mesh structure can be formed by welding/soldering or twisting of the ends to form a durable structure. Waste collection tray 40 is designed to hold liquid and solid waste within cavity formed by floor 42 and side walls 44-50 without leakage. In an alternative embodiment, an optional, removable or permanent liner (not shown) sized to cover the interior surface of the cavity formed by floor 42 and side walls 44–50 can be added to help prevent leakage. Both of the objects created in FIGS. 2 and 3 may be then dipped in vinyl to provide a protective coating to the wire frame to enhance the holder's ability to withstand rusting, enhance its appearance and to allow it to be washed in a dishwasher. Additionally, the present invention can be made or molded from plastic.

An additional embodiment of the present invention is shown in FIGS. 7–11. The embodiment shown in FIGS. 7–11 is similar in many aspects to the embodiment shown in and described with respect to FIGS. 1–6. There are several differences and additional features in this embodiment.

As shown in FIGS. 7–11, collection tray 40 is wider than support structure 15 to insure that drippings of liquid and solid waste do not fall outside of the four side walls 44–50 of waste collection tray 40.

An additional difference is that the three rows (56, 58, 60 as show in FIG. 8) of utensil openings 54 are of three different widths measured between the longitudinal or lengthwise edges 18 or as the lengths of lateral strands 20. The two narrower (58, 60) of the three utensil opening widths allow for kitchen utensils with smaller or narrower working ends to be inserted and stored without falling over. The narrowest utensil opening row 58, may also allow for a handle surface closest to the working end and perpendicular to the shaft of a cooking utensil to rest on the respective longitudinal members. This is shown for handle surface 62 of the knife in FIG. 11. In that case, the respective pairs of longitudinal members 24 and 30 also serve as cooking utensil supports. The utensil openings 54 in the wider of the three rows of openings, row 56, is sized to fit the working end of larger cooking utensils, such as ladles, some spoons, potato mashers, and others.

This exemplary embodiment provides for the top portion of front segment 12c to be essentially the same height as back segment 12a. This means that lop sided u shaped members 12 have equal length back and front vertical members 12b and 12c and that longitudinal member 18b is at the same height as the other topmost longitudinal members. This results in all individual utensil openings 54 occurring at the same height. This helps prevent long handled cooking utensils placed in the utensil opening formed in part by front segment 12c from falling out of the utensil opening or becoming entangled with adjacently stored cooking utensils.

By having the height of front segment 12c essentially the same as back segment 12a, lateral strands 20 now serve as cross members of a sufficient size to fit between the tines or prongs of a fork. Lateral strands 20 are positioned at a height sufficient to maintain the tines of a fork out of any residue collected in collection tray 40. This allows a fork to rest on a later strand 20 to prevent the tines of a fork from passing through waste run off openings (perforations) and contacting liquid or solid residue collected in waste collection tray 40. A sufficiently sized handle of a fork or other utensil may also have a handle surface rest on longitudinal segments 18b and 24. In addition, lateral strands 28a, 28b and 28c define individual utensil openings 54, as shown in FIG. 11. These lateral strands also serve to help maintain cooking utensils in a substantially vertical position without becoming tangled with other stored cooking utensils.

Although the invention is illustrated and described herein with reference to specific embodiments, the invention is not intended to be limited to the details shown. Rather, various modifications may be made in the details within the scope and range of equivalents of the claims and without departing from the invention. Accordingly, it is intended that the appended claims cover all such variations as fall within the spirit and scope of the invention.

What is claimed:

1. A cooking utensil holder for storing cooking utensils having a working end and a handle end, comprising:

a removable waste collection tray having four side walls that define a column like space above the four sidewalls, and a floor for collecting waste;

a support structure for storing the cooking utensils in a substantially vertical position over the removable waste collection tray, the support structure comprising:

an upper end and a lower end, with the lower end positioned above the floor and with both the upper end and the lower end positioned within the column like space defined by the four side walls of the removable waste collection tray;

a waste collection tray holder for removably holding the removable waste collection tray, a perforated drainage grill positioned at the lower end of the support structure, above the walls of the removable waste collection tray within the column like space defined by the four side walls of the removable waste collection tray, at least a first utensil opening, a second utensil opening and a third utensil opening in the upper end of the support structure, each of the utensil openings having a pair of side members defining a length dimension between the pair of side members, and a front member and a rear member defining a width dimension between the front member and the rear member, the first utensil opening greater in width than the respective widths of the second and third utensil openings, the second utensil opening being a slot that is substantially narrower in width than both the first utensil opening and the third utensil opening, and the third utensil opening narrower in width than the first utensil opening, a vertical compartment for each of the utensil openings, each vertical compartment descending to the perforated drainage grill; and at least one cooking utensil support substantially centered in the vertical compartment for the third utensil opening, positioned closer to the perforated drainage grill than the third utensil opening and parallel to the pair of side members for the third utensil opening.

2. A cooking utensil holder in accordance with claim 1 further comprising a handle on the waste collection tray.

3. A cooking utensil holder for storing cooking utensils in accordance with claim 2 wherein the support structure further comprises sidewalls disposed between the upper end and the lower end, the sidewalls having openings of sufficient size to allow a user to see and identify stored cooking utensils.

4. A cooking utensil holder for storing cooking utensils in accordance with claim 1 further comprising at least one divider between each of the cooking utensil openings and within the sidewalls to prevent contact between the working ends of cooking utensils stored in the cooking utensil holder.

5. A cooking utensil holder for storing cooking utensils in accordance with claim 4 wherein each of the utensil openings are positioned at the same height as the other cooking utensil openings.

6. A cooking utensil holder for storing cooking utensils in accordance with claim 1 wherein the support structure is comprised of wire mesh.

7. A cooking utensil holder for storing cooking utensils in accordance with claim 1 wherein the support structure is comprised of molded plastic.

8. A cooking utensil holder for storing cooking utensils in accordance with claim 1 wherein the at least one cooking utensil support is a fork supporting cross member positioned in the first utensil opening, the cross member spanning the width of the second utensil opening.

* * * * *